United States Patent
Sun et al.

(10) Patent No.: US 10,243,463 B2
(45) Date of Patent: Mar. 26, 2019

(54) NON-INVERTING BUCK-BOOST CONVERTER CONTROL

(71) Applicant: Texas Instruments Incorporated, Dallas, TX (US)

(72) Inventors: Yueming Sun, Shanghai (CN); Yihan Yao, Wuxi (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/729,366

(22) Filed: Oct. 10, 2017

(65) Prior Publication Data

US 2018/0358900 A1   Dec. 13, 2018

Related U.S. Application Data

(63) Continuation of application No. PCT/CN2017/087618, filed on Jun. 8, 2017.

(51) Int. Cl.
   *H02M 3/158* (2006.01)
(52) U.S. Cl.
   CPC .................. *H02M 3/1582* (2013.01)
(58) Field of Classification Search
   CPC ..... H02M 3/156–3/158; H02M 3/1582; G05F 1/00; G05F 1/10; G05F 1/652; Y02B 70/1466
   USPC .................................................. 323/271–285
   See application file for complete search history.

(56) References Cited

U.S. PATENT DOCUMENTS

| | | | |
|---|---|---|---|
| 5,402,060 A | 3/1995 | Erisman | |
| 6,166,527 A | 12/2000 | Dwelley et al. | |
| 6,215,286 B1 | 4/2001 | Scoones | |
| 6,348,781 B1 | 2/2002 | Midya et al. | |
| 7,042,199 B1 | 5/2006 | Birchenough | |
| 7,518,346 B2 | 4/2009 | Prexl et al. | |

(Continued)

FOREIGN PATENT DOCUMENTS

| | | |
|---|---|---|
| CN | 101499718 A | 8/2009 |
| CN | 102097940 A | 6/2011 |

(Continued)

OTHER PUBLICATIONS

Gaboriault et al. "A High Efficiency, Non-Inverting, Buck-Boost DC-DC Converter," Applied Power Electronics Conference and Exposition, 2004. Apec '04. Nineteenth Annual IEEE Anaheim, CA, USA Feb. 22-26, 2004, Piscataway, NJ, USA, pp. 1411-1415.

(Continued)

*Primary Examiner* — Yemane Mehari
(74) *Attorney, Agent, or Firm* — Tuenlap Chan; Charles A. Brill; Frank D. Cimino (57) ABSTRACT

An apparatus comprises a voltage supply configured to provide an input voltage, a buck-boost converter coupled to the voltage supply and comprising an inductor, and a buck-boost controller coupled to the power supply and the buck-boost converter. The buck-boost controller comprises a mode controller coupled to the buck-boost converter and a comparator coupled to the mode controller and the buck-boost converter. The comparator is configured to compare an error signal based on an output voltage of the buck boost-converter to an output current of the inductor to produce a control signal. The mode controller is configured to control the output voltage at least in part according to the control signal.

20 Claims, 4 Drawing Sheets

(56) References Cited

U.S. PATENT DOCUMENTS

| | | | |
|---|---|---|---|
| 2009/0206772 A1* | 8/2009 | Bayer | H02M 3/1582 315/294 |
| 2011/0169468 A1 | 7/2011 | Wu et al. | |
| 2013/0063102 A1 | 3/2013 | Chen | |
| 2014/0159689 A1 | 6/2014 | Chen | |
| 2017/0040898 A1* | 2/2017 | Hong | H02M 3/1582 |

FOREIGN PATENT DOCUMENTS

| | | | |
|---|---|---|---|
| CN | 102427294 A | 4/2012 | |
| CN | 103023326 A | 4/2013 | |
| CN | 105720816 A | 6/2016 | |
| EP | 1601091 A2 * | 11/2005 | H02M 3/156 |

OTHER PUBLICATIONS

Search Report for PCT/EP2007/052057, dated Oct. 8, 2007 (2 pages).
Search Report for PCT Application No. PCT/CN2017/087618, dated Mar. 15, 2018 (2 pages).
English Machine Translation for CN101499718A (14 pages).
English Machine Translation for CN102097940A (13 pages).
English Machine Translation for CN105720816A (23 pages).

* cited by examiner

FIG. 4

NON-INVERTING BUCK-BOOST CONVERTER CONTROL

BACKGROUND

Voltage converters convert an input voltage into an output voltage that is, in many circumstances, different than the input voltage. Buck converters provide step-down conversion in which the output voltage is less than the input voltage. Boost converters provide step-up conversion in which the output voltage is greater than the input voltage. Buck-boost converters provide both step-down and step-up conversion in which the output voltage may be less than, or greater than, the input voltage.

SUMMARY

In some embodiments, an apparatus comprises a voltage supply configured to provide an input voltage, a buck-boost converter coupled to the voltage supply and comprising an inductor, and a buck-boost controller coupled to the power supply and the buck-boost converter. The buck-boost controller comprises a mode controller coupled to the buck-boost converter and a comparator coupled to the mode controller and the buck-boost converter. The comparator is configured to compare an error signal based on an output voltage of the buck boost-converter to an output current of the inductor to produce a control signal. The mode controller is configured to control the output voltage at least in part according to the control signal.

Other embodiments are directed to a buck-boost controller comprising a current comparator configured to compare an error signal to an inductor current of a buck-boost converter and a first time generator coupled to the current comparator and configured to generate a first signal indicating a first time period at least partially based on an output of the current comparator. The first time period is a time period for controlling the buck-boost converter to operate in a first operation mode. The controller also includes a mode controller coupled to the first time generator and configured to generate a first control signal to control at least a first portion of the buck-boost converter at least partially according to the first signal indicating the first time period.

In yet other embodiments, a method comprises controlling a first pair of transistor switches in a buck-boost converter comprising four transistor switches to turn on and begin a time period TON_b, controlling a second pair of transistor switches in the buck-boost converter to turn on when the time period TON_b expires and begin a time period TOFF_b, controlling the first pair of transistor switches to turn on when a control signal is received before the time period TOFF_b reaches a maximum threshold time TOFFmax, controlling a third pair of transistor switches in the buck-boost converter to turn on when the control signal is not received before the time period TOFF_b reaches the maximum threshold time TOFFmax and begin a time period TOFF_a, and controlling the first pair of transistor switches to turn on when a second control signal is received before the time period TOFF_a reaches a threshold time TOFF_trans_a.

BRIEF DESCRIPTION OF THE DRAWINGS

For a detailed description of various examples, reference will now be made to the accompanying drawings in which.

DETAILED DESCRIPTION

Disclosed are embodiments that provide for substantially smooth transitions among buck, boost, and buck-boost operation modes of a voltage converter. To provide for the substantially smooth transitions, the voltage converter operates in a quasi-constant on-time valley current mode during boost operation mode, quasi-constant off-time peak current mode during buck operation mode, and using a tri-phase switching control during buck to boost, or boost to buck, transitions. The transitions are based, for example, at least in part on an amount of time that a given switch (e.g., a transistor implemented as a switch) is open in a circuit of the voltage converter.

Figure 1:
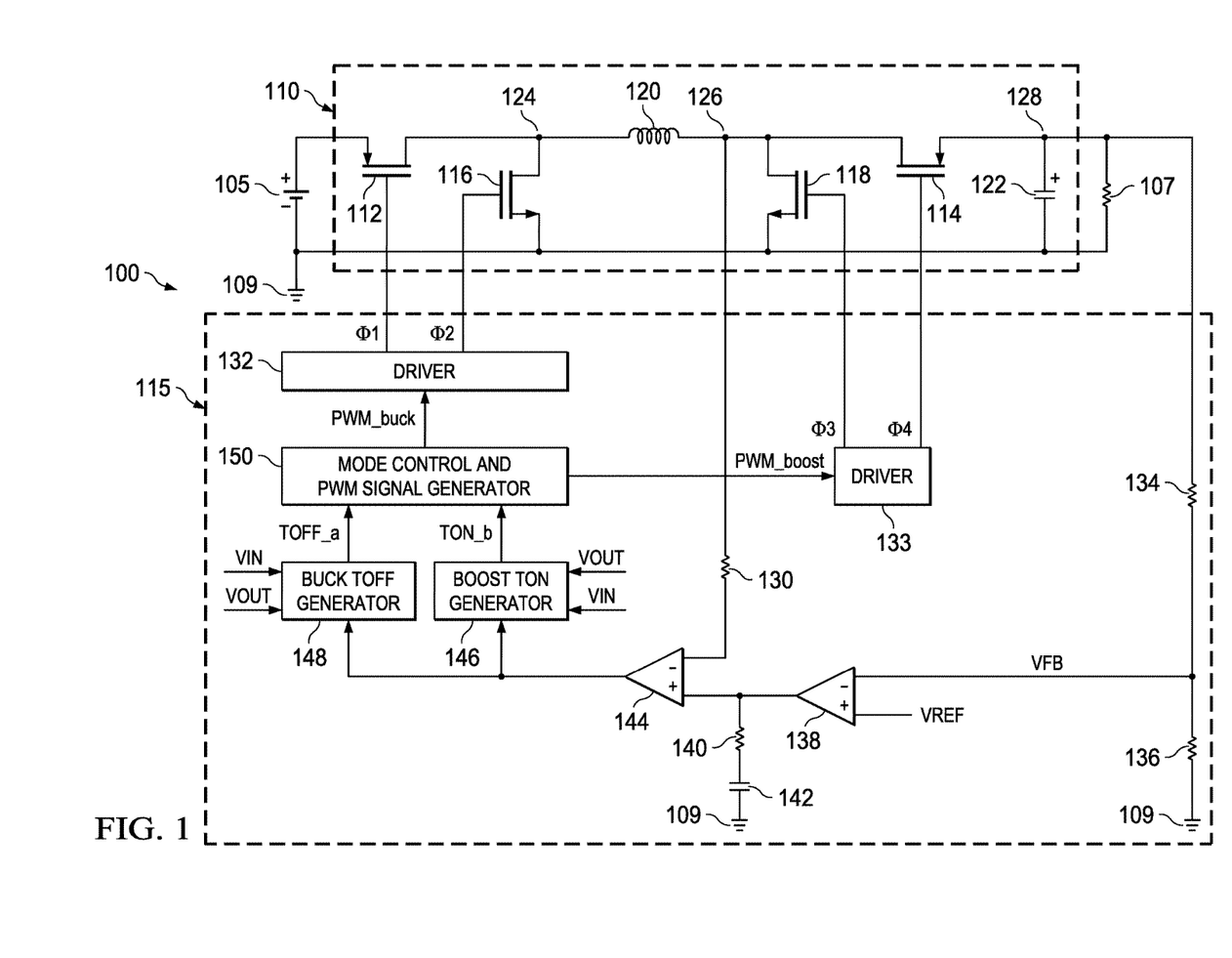
FIG. 1 shows a schematic diagram of a voltage converter in accordance with various embodiments.

FIG. 1 is a schematic diagram of a voltage converter 100 in accordance with various embodiments. The voltage converter 100 is implemented as a buck-boost converter configured to produce an output voltage that is substantially less than, equal to, or greater than an input voltage. In some embodiments, the voltage converter 100 is implemented as an integrated circuit, e.g., sharing a silicon substrate. In other embodiments, the voltage converter 100 may be implemented as one or more separate components that may be coupled together. The input voltage is received from a voltage source 105. The voltage source is, in some embodiments, a battery which may have a variable voltage. For example, as the battery discharges, the input voltage supplied by the battery may decrease. Conversely, as the battery charges, the input voltage supplied by the battery may increase. In some embodiments it may be desired that the output voltage remain substantially stable (e.g., such that there is no, or minimal, variation in a value of the output voltage).

To produce the output voltage, the voltage converter 100 steps-down the voltage received from the voltage source 105 when the voltage received from the voltage source 105 is greater than the output voltage and steps-up the voltage received from the voltage source 105 when the voltage received from the voltage source 105 is less than the output voltage. In this way, the voltage converter operates as a buck converter when the voltage received from the voltage source 105 is greater than the output voltage and operates as a boost converter when the voltage received from the voltage source 105 is less than the output voltage. When the voltage received from the voltage source 105 is about equal to the output voltage (e.g., having a deviation from the output voltage of less than about five percent, less than about 10 percent, or less than about 20%), the voltage converter 100 may operate as a buck-boost converter in which case the voltage converter 100 alternates one or more times between buck operation mode and buck operation mode. The period of time during which the voltage converter 100 operates as the buck-boost converter alternating between buck operation mode and buck operation mode is referred to, in some embodiments, as tri-phase switching operation mode.

The voltage converter 100 comprises a buck-boost converter 110 and a buck-boost controller 115. The buck-boost converter 110 is coupled to the voltage source 105 and a bad 107 and is configured to provide a substantially stable (e.g., consistent and/or minimally changing) output voltage to the bad 107. The buck-boost controller 115 is coupled to the voltage source 105 and the buck-boost converter 110 and is configured to control whether the buck-boost converter 110 is performing in buck operation mode, boost operation mode, or tri-phase switching operation mode. The buck-boost controller controls the method of operation of the buck-boost converter 110, in some embodiments, based at least in part on at least some of a value of the input voltage of the buck-boost converter 110, a value of the output voltage of the buck-boost converter 110, and/or an amount of time that a switch of the buck-boost converter 110 is in a given state (e.g., open and/or closed).

The buck-boost converter 110 comprises p-type metal oxide semiconductor (PMOS) transistors 112 and 114, n-type metal oxide semiconductor (NMOS) transistors 116 and 118, inductor 120, and capacitor 122. Each of the PMOS transistor 112, PMOS transistor 114, NMOS transistor 116, and NMOS transistor 118 may comprise a gate terminal, a drain terminal, and a source terminal. Any one of the PMOS transistor 112, PMOS transistor 114, NMOS transistor 116, or NMOS transistor 118 may be controlled by any device or signal and may have its gate terminal coupled, directly or indirectly, to the device. Any one of the PMOS transistor 112, PMOS transistor 114, NMOS transistor 116, and/or NMOS transistor 118 said to be coupled between two points may be understood to have its drain terminal coupled to a first of the two points and its source terminal coupled to a second of the two points. Additionally, the PMOS transistor 112, PMOS transistor 114, NMOS transistor 116, and/or NMOS transistor 118 may be any suitable devices such as depletion mode transistors, enhancement mode transistors, and the like.

The PMOS transistor 112 is coupled between the voltage source 105 and a node 124 and is controlled by the buck-boost controller 115. The NMOS transistor 116 is coupled between the node 124 and a ground potential 109 and is controlled by the buck-boost controller 115. The inductor 120 is coupled between the node 124 and a node 126. The NMOS transistor 118 is coupled between the node 126 and the ground potential 109 and is controlled by the buck-boost controller 115. The PMOS transistor 114 is coupled between the node 126 and a node 128 and is controlled by the buck-boost controller 115. The capacitor 122 is coupled between the node 128 and the ground potential 109.

The buck-boost controller 115 comprises a sense resistor 130, drivers 132 and 133, feedback resistors 134 and 136, error amplifier 138, compensation resistor 140, compensation capacitor 142, current comparator 144, boost time generator 146, buck time generator 148, and mode controller 150. The driver 132 is coupled to the PMOS transistor 112 and the NMOS transistor 116 and configured to control operation of the PMOS transistor 112 and the NMOS transistor 116 (e.g., when the PMOS transistor 112 or the NMOS transistor 116 function as closed switches and when PMOS transistor 112 and the NMOS transistor 116 function as open switches). The driver 133 is coupled to the PMOS transistor 114 and the NMOS transistor 118 and configured to control operation of the PMOS transistor 114 and the NMOS transistor 118 (e.g., when the PMOS transistor 114 and the NMOS transistor 118 function as closed switches and when PMOS transistor 114 and the NMOS transistor 118 function as open switches).

The feedback resistors 134 and 136 are coupled together in series to form a voltage divider coupled between the nodes 128 (e.g., the output of the buck-boost converter 110) and the ground potential 109. An output of the voltage divider (e.g., taken from a coupling between the feedback resistor 134 and the feedback resistor 136) is coupled to a negative input of the error amplifier 138. A positive input of the error amplifier 138 is coupled to a reference voltage. The reference voltage is, in some embodiments, about 1 volt, about 1.2 volts, or any other suitable voltage, a scope of which is not limited herein. The error amplifier 138 is configured to subtract a voltage received at the negative input from a voltage received at the positive input and output a current having a value that is approximated by a gain of the error amplifier multiplied by the difference in the positive and negative inputs received by the error amplifier 138. The compensation resistor 140 and the compensation capacitor 142 together form a compensation network configured to filter the output of the error amplifier 138 prior to receipt of the output of the error amplifier 138 by the current comparator 144.

The output of the error amplifier 138 is provided to the current comparator 144 at a positive input. The sense resistor 130 is coupled between the node 126 and a negative input of the current comparator 144. The sense resistor 130, in some embodiments, is used by the buck-boost controller 115 to measure a current flowing out of the inductor 120. The current comparator 144 is configured to compare the inputs received on its positive and negative inputs and output a signal based on a relationship between the received inputs. For example, when the input received at the negative input of the current comparator 144 equals the input received at the positive input of the current comparator 144, the current comparator 144 may output a first signal (e.g., a signal having a voltage sufficiently high as to signify a logical "1"). When the input received at the negative input of the current comparator 144 does not equal the input received at the positive input of the current comparator 144, the current comparator 144 may output a second signal (e.g., a signal having a voltage sufficiently low as to signify a logical "0"). In other embodiments, the output of the current comparator 144 may be any suitable value determined according to a relationship between the inputs received on the positive and negative inputs of the current comparator 144. The output of the current comparator 144 is coupled to the boost time generator 146 and the buck time generator 148 and configured to, at least partially, control operation of the buck-boost converter 110.

The boost time generator 146 and the buck time generator 148 are each coupled to the voltage source 105, the node 128 (e.g., the output of the buck-boost converter 110), and the output of the current comparator 144. The boost time generator 146 and the buck time generator 148 are each configured to generate a signal based on a relationship between the input voltage of the buck-boost converter 105 and the output voltage of the buck-boost converter 105. For example, as discussed in greater detail below, based on a relationship between the input voltage and the output voltage the boost time generator 146 generates a signal TON_b and transmits the signal to the mode controller 150. The signal TON_b, in some embodiments, is used, at least partially, in determining an amount of time that a switch in the buck-boost converter 110 should be open while the buck-boost converter 110 operates in the boost operation mode. Similarly, based on a relationship between the input voltage and the output voltage the buck time generator 148 generates a signal TOFF_a and transmits the signal to the mode controller 150. The signal TOFF_a, in some embodiments, is used, at least partially, in determining an amount of time that a switch in the buck-boost converter 110 should be closed while the buck-boost converter 110 operates in the buck operation mode.

The mode controller 150 is configured to receive the signals TON_b and TOFF_a from the boost time generator 146 and the buck time generator 148, respectively, and generate one or more for controlling the buck-boost converter 110. In some embodiments, the signals generated by the mode controller 150 may be pulse width modulation (PWM) coded signals. For example, the mode controller 150 may generate a PWM_buck signal for controlling the buck-boost controller 110 during buck operations and a PWM_boost signal for controlling the buck-boost controller 110 during boost operations. The drivers 132 and 133 are coupled to the mode controller 150 and configured to receive the PWM_buck and PWM_boost signals, respectively. The drivers 132 and 133 are further configured to control a plurality of transistors of the buck-boost converter 110 according to the received PWM_buck and PWM_boost signals, respectively. For example, the driver 132 may be configured to control the PMOS transistor 112 and the NMOS transistor 116 at least partially according to the PWM_buck signal and the driver 134 may be configured to control the PMOS transistor 114 and the NMOS transistor 118 at least partially according to the PWM_boost signal.

Figure 2:
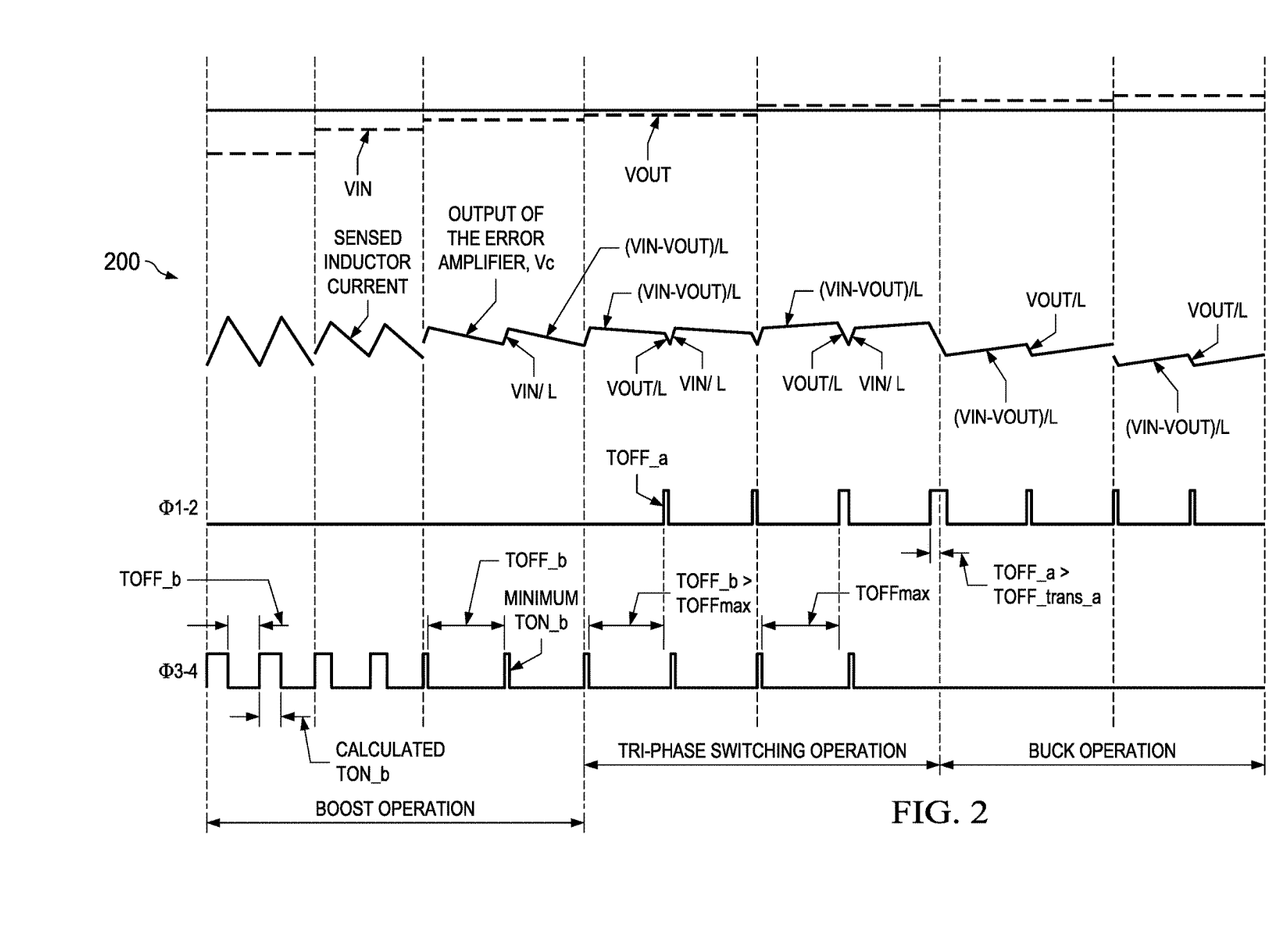
FIG. 2 shows a signal diagram of a boost to buck transition of the voltage converter in accordance with various embodiments.

FIG. 2 shows a signal diagram 200 of a boost to buck transition of the voltage converter in accordance with various embodiments. The signal diagram 200 illustrates operation of the voltage converter 100 in accordance with various embodiments, and thus will be discussed with reference to components described above and illustrated in FIG. 1. During boost operation mode, the voltage converter 100 operates according to a principle of quasi-constant on-time (TON) valley current mode control and an off-time (TOFF) determined by a control loop. TON is calculated (e.g., by the boost time generator 146) according to a relationship between the input voltage (VIN) and the output voltage (VOUT) of the buck-boost converter 110. Based on the calculated TON, one or more switches of the buck-boost converter 110 is controlled to generate VOUT. The number of times that the switches are controlled to be opened or closed may be referred to as the switching frequency (fsw). When operating in a continuous conduction mode (CCM), the buck-boost converter 110 has a switching frequency approximately equal to that as shown by the following Equation 1 in which D is a duty cycle of the PWM coded signal discussed above.

$$fsw = \frac{D}{TON} = \frac{(VOUT - VIN)}{(VOUT * TON)} \quad \text{(Equation 1)}$$

Additionally, the switching frequency of the buck-boost converter 110 when operating in the boost operation mode may be referred to as quasi-fixed when TON is calculated according to the following Equation 2 in which K is a target cycle time in a switching cycle of the voltage converter 100.

$$TON = K * \frac{(VOUT - VIN)}{VOUT} \quad \text{(Equation 2)}$$

During the boost operation mode, when the input voltage is lower than the output voltage, a switching cycle begins when the NMOS transistor 118 is turned on (e.g., when controlled by the driver 133 to turn on). In addition, an output current of the inductor 120 ramps up or increases for a TON_b time, as determined by the boost time generator 146. Once TON_b expires, the NMOS transistor 118 is turned off and the PMOS transistor 114 is turned on (e.g., beginning the TOFF_b time, period). The output current of the inductor 120 decreases during the time TOFF_b. Once the inductor 120 valley current reaches a value set by the error amplifier 138 (e.g., an inductor 120 output current sensed by the sense resistor 130 is about equal to the output of the error amplifier 138), the current comparator 140 generates a control signal that causes the boost time generator 146 to initiate a new TON_b phase and the above process repeats. During purely boost operation mode, the PMOS transistor 112 is permanently on and the NMOS transistor 116 is permanently off.

When VIN increases to approach VOUT, the buck-boost converter 110 may transition from a purely boost operation mode to a buck-boost operation mode. While in the boost operation mode, the calculated time TON_b decreases as a value of VIN increases to approach a value of VOUT. When the VIN is approximately equal to VOUT, TON_b may be set to a predetermined minimum value TON_b_min. Additionally, as the value of VIN increases to approach a value of VOUT, a voltage across the inductor 120 decreases, as well as a rate of change in the output current of the inductor 120 during the time period TOFF_b. Once VIN is approximately equal to VOUT and TON_b is reduced to TON_b_min, the buck-boost controller 115 increases TOFF_b (e.g., via the boost time generator 146) so that a value of the inductor 120 output current at the beginning of TON_b is approximately equal to a value of the inductor 120 output current at the end of TOFF_b.

A timer is implemented in at least one of the buck time generator 148, boost time generator 146, or the mode controller 150 to monitor TOFF_b and compare it with a value TOFFmax that defines a longest TOFF_b allowed in purely boost operation. The TOFFmax may be a predetermined value. If TOFF_b is longer than TOFFmax, a buck operation mode off-time TOFF_a is introduced to decrease the output current of the inductor 120. The decrease, in some embodiments, may be a comparatively rapid decrease when compared to a decrease during purely boost operation mode. During the TOFF_a phase, the PMOS transistor 112 is turned off and the NMOS transistor 116 is turned on. Once the output current of the inductor 120 returns to the current level set by the error amplifier 138, a new cycle begins from TON_b (e.g., as a result of a new signal being generated by the boost time generator 146 in response to receiving a signal from the current comparator 144). In this way, the buck-boost converter 110 operates in the tri-phase switching operation mode by transitioning from TON_b to TOFF_b to TOFF_a.

When VIN increases further with respect to VOUT, a slope of the output current of the inductor 120 during the period TOFF_b becomes positive. As a result, an increased duration of TOFF_a may elapse to ramp down the output current of the inductor 120. To monitor the time TOFF_a, a second timer is implemented in at least one of the buck time generator 148, boost time generator 146, or the mode controller 150. If TOFF_a is longer than a value TOFF_trans_a that defines the longest TOFF_a allowed in tri-phase switching operation mode, TOFF_a extends for a period defined by the buck time generator 148, thereby causing the buck-boost converter 110 to operate in purely buck operation mode and realizing a boost to buck operation mode transition.

Figure 3:
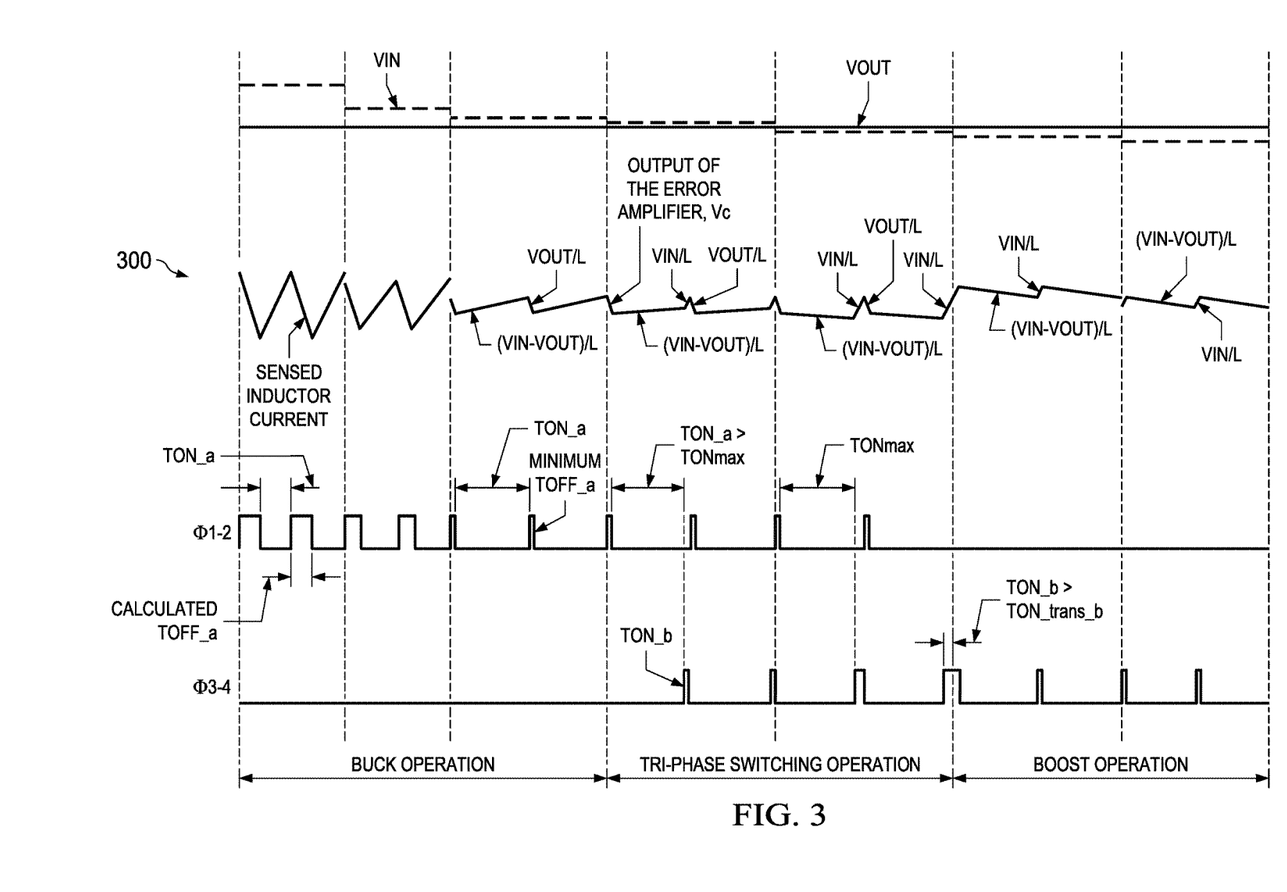
FIG. 3 shows a signal diagram of a buck to boost transition of the voltage converter in accordance with various embodiments.

FIG. 3 shows a signal diagram 300 of a buck to boost transition of the voltage converter in accordance with various embodiments. The signal diagram 300 illustrates operation of the voltage converter 100 in accordance with various embodiments, and thus will be discussed with reference to components described above and illustrated in FIG. 1. During buck operation mode, when the input voltage is greater than the output voltage, the switching cycle begins when the PMOS transistor 112 is turned on (e.g., when controlled by the driver 132 to turn on). In addition, the output current of the inductor 120 ramps up or increases for a TON_a time, as determined by the buck time generator 148. A switching frequency of the buck-boost converter 110 when operating in the buck operation mode may be referred to as quasi-fixed when TOFF is calculated according to the following Equation 3 in which K is a target cycle time in a switching cycle of the voltage converter 100.

$$TOFF = K * \frac{(VIN - VOUT)}{VIN} \qquad \text{(Equation 3)}$$

Once the inductor 120 output current reaches a value set by the error amplifier 138 (e.g., an inductor 120 output current sensed by the sense resistor 130 is about equal to the output of the error amplifier 138), the current comparator 140 generates a control signal that causes the buck time generator 148 to initiate a new TOFF_a phase. During the TOFF_a phase, the PMOS transistor 112 is turned off, the NMOS transistor 116 is turned on, and the output current of the inductor 120 decreases. When TOFF_a expires, a new cycle begins and the above process repeats. During buck operation mode, the PMOS transistor 114 is permanently on and the NMOS transistor 118 is permanently off.

When VIN decreases to approach VOUT, the buck-boost converter 110 may transition from a purely buck operation mode to a buck-boost operation mode. While in the boost operation mode, the calculated time TOFF_a decreases as a value of VIN decreases to approach a value of VOUT. When the VIN is approximately equal to VOUT, TOFF_a may be set to a predetermined minimum value, TOFF_a_min. Additionally, as the value of VIN decreases to approach a value of VOUT, a voltage across the inductor 120 decreases, as well as a rate of change in the output current of the inductor 120 during the time period TON_a. Once VIN is approximately equal to VOUT and TOFF_a is reduced to TOFF_a_min, the buck-boost controller 115 increases TON_a (e.g., via the buck time generator 148) so that a value of the inductor 120 output current at the beginning of TOFF_a is approximately equal to a value of the inductor 120 output current at the end of TON_a.

A third timer is implemented in at least one of the buck time generator 148, boost time, generator 146, or the mode controller 150 to monitor TON_a and compare it with a value TONmax that defines a longest TON_a allowed in purely buck operation. The TONmax may be a predetermined value. If TON_a is longer than TONmax, a boost operation mode on-time TON_b is introduced to increase the output current of the inductor 120. The increase, in some embodiments, may be a comparatively rapid increase when compared to an increase during purely buck operation mode. During the TON_b phase, the PMOS transistor 114 is turned off and the NMOS transistor 118 is turned on. Once the output current of the inductor 120 returns to the current level set by the error amplifier 138, a new cycle begins from TOFF_a (e.g., as a result of a new signal being generated by the buck time generator 148 in response to receiving a signal from the current comparator 144). In this way, the buck-boost converter 110 operates in the tri-phase switching operation mode by transitioning from TOFF_a to TON_a to TON_b.

When VIN decreases further with respect to VOUT, a slope of the output current of the inductor 120 during the period TON_a becomes negative. As a result, an increased duration of TON_b may elapse to ramp up the output current of the inductor 120. To monitor the time TON_b, a fourth timer is implemented in at least one of the buck time generator 148, boost time generator 146, or the mode controller 150. If TON_b is longer than a value TON_trans_b that defines the longest TON_b allowed in tri-phase switching operation mode, TON_b extends for a period defined by the boost time generator 146, thereby causing the buck-boost converter 110 to operate in purely boost operation mode and realizing a buck to boost operation mode transition.

Figure 4:
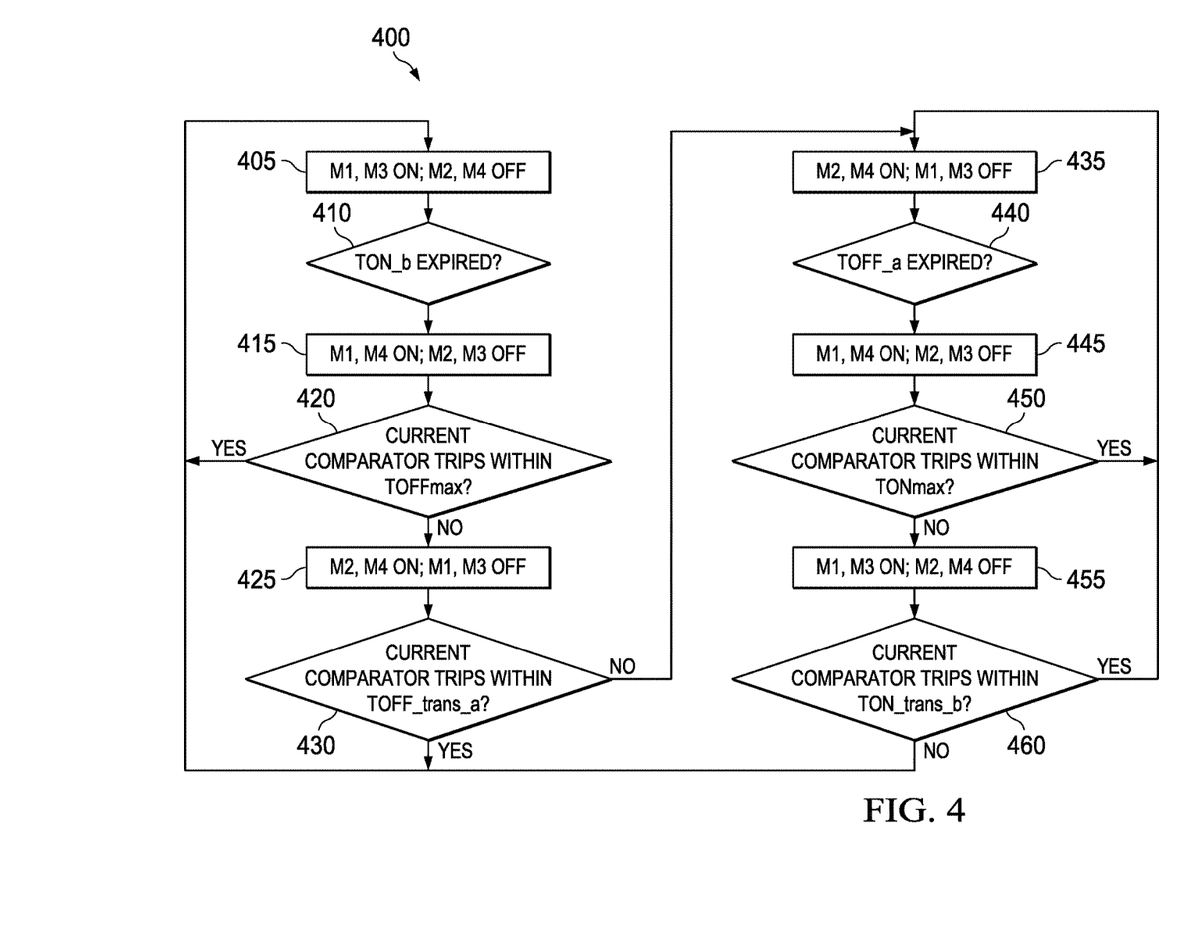
FIG. 4 shows a flowchart of operation of the voltage converter in accordance with various embodiments.

FIG. 4 is a flowchart of a method 400 of operation of the voltage converter in accordance with various embodiments. The method 400 is implemented, for example, by the buck-boost controller 115 of the voltage converter 100 to control the buck-boost converter 110, each of FIG. 1. At operation 405, the buck-boost controller 115 controls the PMOS transistor 112 (illustrated as M1 in FIG. 4) and the NMOS transistor 118 (illustrated as M3 in FIG. 4) to turn on and controls the PMOS transistor 114 (illustrated as M2 in FIG. 4) and the NMOS transistor 116 (illustrated as M4 in FIG. 4) to turn off, thereby beginning a time period TON_b. At operation 410, the buck-boost controller 115 determines whether the time period TON_b has expired (e.g., a countdown has completed and/or expired). When the time period TON_b has not expired, the buck-boost controller 115 remains at operation 410. When the time period TON_b has expired, the buck-boost controller 115 proceeds to operation 415.

At operation 415, the buck-boost controller 115 controls the PMOS transistors 112 and 114 to turn on and the NMOS transistors 116 and 118 to turn off. At operation 420, the buck-boost controller 115 determines whether a control signal has been received from the current comparator 144 prior to a time TOFFmax. When the control signal has been received prior to the time TOFFmax, the buck-boost controller 115 proceeds to operation 405. When the control signal has not been received prior to the time TOFFmax, the buck-boost controller 115 proceeds to operation 425.

At operation 425, the buck-boost controller 115 controls the PMOS transistor 114 and the NMOS transistor 116 to turn on and the PMOS transistor 112 and the NMOS transistor 118 to turn off. At operation 430, the buck-boost controller 115 determines whether a control signal has been received from the current comparator 144 prior to a time TOFF_trans_a. When the control signal has been received prior to the time TOFF_trans_a, the buck-boost controller 115 proceeds to operation 405. When the control signal has not been received prior to the time TOFF_trans_a, the buck-boost controller 115 proceeds to operation 435.

At operation 435, the buck-boost controller 115 controls the PMOS transistor 114 and the NMOS transistor 116 to turn on and controls the PMOS transistor 112 and the NMOS transistor 118 to turn off, thereby beginning a time period TOFF_a. At operation 440, the buck-boost controller 115 determines whether the time period TOFF_a has expired (e.g., a countdown has completed and/or expired). When the time period TOFF_a has not expired, the buck-boost controller 115 remains at operation 440. When the time period TOFF_a has expired, the buck-boost controller 115 proceeds to operation 445.

At operation 445, the buck-boost controller 115 controls the PMOS transistors 112 and 114 to turn on and the NMOS transistors 116 and 118 to turn off. At operation 450, the buck-boost controller 115 determines whether a control signal has been received from the current comparator 144 prior to a time TONmax. When the control signal has been received prior to the time TONmax, the buck-boost controller 115 proceeds to operation 435. When the control signal has not been received prior to the time TONmax, the buck-boost controller 115 proceeds to operation 455.

At operation 455, the buck-boost controller 115 controls the PMOS transistor 112 and the NMOS transistor 118 to turn on and the PMOS transistor 114 and the NMOS transistor 116 to turn off. At operation 460, the buck-boost controller 115 determines whether a control signal has been received from the current comparator 144 prior to a time TON_trans_b. When the control signal has been received prior to the time TON_trans_b, the buck-boost controller 115 proceeds to operation 435. When the control signal has not been received prior to the time TON_trans_b, the buck-boost controller 115 proceeds to operation 405.

While the operations of the method 400 have been discussed and labeled with numerical references, it should be noted that the method 400 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure. For example, while the method 400 is described above as beginning at operation 405 (e.g., corresponding to a boost operation mode), the method 400 may instead begin at operation 435 (e.g., corresponding to a buck operation).

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about", "approximately", or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An apparatus, comprising:
a voltage supply configured to provide an input voltage;
a buck-boost converter coupled to the voltage supply and comprising an inductor; and
a buck-boost controller coupled to the voltage supply and the buck-boost converter and comprising:
a mode controller coupled to the buck-boost converter; and
a comparator coupled to the mode controller and the buck-boost converter,
wherein the comparator is configured to compare an error signal based on an output voltage of the buck-boost converter to an output current of the inductor to produce a control signal, and
wherein the mode controller is configured to control the output voltage at least in part according to the control signal.

2. The apparatus of claim 1, further comprising a boost time generator coupled between the comparator and the mode controller, wherein the boost time generator is configured to control a boost on time of the buck-boost converter at least in part according to the control signal, the input voltage, and the output voltage to produce a time signal.

3. The apparatus of claim 1, further comprising a buck time generator coupled between the comparator and the mode controller, wherein the buck time generator is configured to control a buck off time of the buck-boost converter at least in part according to the control signal, the input voltage, and the output voltage to produce a time signal.

4. The apparatus of claim 3, wherein the mode controller is configured to generate a pulse width modulation signal according to the time signal to control an operational mode of the buck-boost converter.

5. The apparatus of claim 1, wherein the buck-boost controller is configured to:
control the buck-boost converter to operate in a buck operation mode when a value of the input voltage is greater than the output voltage;
control the buck-boost converter to operate in a boost operation mode when the value of the input voltage is less than the output voltage; and
control the buck-boost converter in a tri-phase switching operation mode when the input voltage is about equal to the output voltage.

6. The apparatus of claim 5, wherein in the tri-phase operation mode, the buck-boost controller is configured to control the buck-boost converter to:
operate in a first of the boost operation mode or the buck operation mode during a first period of time;
operate in a second of the boost operation mode or the buck operation mode during a second period of time;
operate in the first of the boost operation mode or the buck operation mode during a third period of time when a duration of the second period of time does not exceed a maximum time threshold; and
operate in the second of the boost operation mode or the buck operation mode during a fourth period of time when the duration of the second period of time exceeds the maximum time threshold.

7. The apparatus of claim 1, wherein the buck-boost controller further comprises an error amplifier configured to produce the error signal at least in part according to the output voltage and a reference voltage.

8. A buck-boost controller, comprising:
a current comparator configured to compare an error signal to an inductor current of a buck-boost converter;
a first time generator coupled to the current comparator and configured to generate a first signal indicating a first time period at least partially based on an output of the current comparator, wherein the first time period is a time period for controlling the buck-boost converter to operate in a first operation mode; and a mode controller coupled to the first time generator and configured to generate a first control signal to control at least a first portion of the buck-boost converter at least partially according to the first signal indicating the first time period.

9. The buck-boost controller of claim 8, further comprising an error amplifier configured to produce the error signal at least partially according to an output voltage of the buck-boost converter and a reference voltage received by the error amplifier.

10. The buck-boost controller of claim 8, further comprising a first driver coupled to the mode controller and configured to drive at least the first portion of the buck-boost converter according to the first control signal.

11. The buck-boost controller of claim 8, wherein the buck-boost controller is configured to control a plurality of portions of the buck-boost converter, wherein controlling the plurality of portions of the buck-boost converter controls the buck-boost converter to operate in one of three operation modes to generate an output voltage of the buck-boost converter from an input voltage received by the buck-boost converter, and wherein the buck-boost controller controls the buck-boost converter to operate in one of three operation modes at least according to an amount of time that a portion of the buck-boost converter has been turned on.

12. The buck-boost controller of claim 11, wherein the buck-boost controller is configured to control the buck-boost converter to operate in a buck operation mode when the input voltage exceeds the output voltage, wherein the buck-boost controller is configured to control the buck-boost converter to operate in a boost operation mode when the input voltage is less than the output voltage, and wherein the buck-boost controller is configured to control the buck-boost converter to operate in a tri-phase switching operation mode when the input voltage is about equal to the output voltage.

13. The buck-boost controller of claim 12, wherein in the tri-phase operation mode the, the buck-boost controller is configured to control the buck-boost converter to:

operate in a first of the boost operation mode or the buck operation mode during a first period of time;

operate in a second of the boost operation mode or the buck operation mode during a second period of time;

operate in the first of the boost operation mode or the buck operation mode during a third period of time when a duration of the second period of time does not exceed a maximum time threshold; and operate in the second of the boost operation mode or the buck operation mode during a fourth period of time when the duration of the second period of time exceeds the maximum time threshold.

14. The buck-boost controller of claim 12, wherein in the tri-phase operation mode, the buck-boost controller is configured to:

control the first portion of the buck-boost controller to be active to cause the buck-boost controller to operate in the buck operation mode during the first time period;

control a second portion of the buck-boost controller to be active to cause the buck-boost controller to operate in the boost operation mode during a second period of time;

control the first portion of the buck-boost controller to be active when a duration of the second period of time does not exceed a maximum time threshold; and control a third portion of the buck-boost controller to be active during a fourth period of time when the duration of the second period of time exceeds the maximum time threshold.

15. A method, comprising:

controlling a first pair of transistor switches in a buck-boost converter comprising four transistor switches to turn on and begin a time period TON_b;

controlling a second pair of transistor switches in the buck-boost converter to turn on when the time period TON_b expires and begin a time period TOFF_b;

controlling the first pair of transistor switches to turn on when a control signal that results from comparing an output current in an inductor of the buck-boost converter to an error signal based on an output voltage of the buck-boost converter is received before the time period TOFF_b reaches a maximum threshold time TOFFmax;

controlling a third pair of transistor switches in the buck-boost converter to turn on when the control signal is not received before the time period TOFF_b reaches the maximum threshold time TOFFmax and begin a time period TOFF_a; and controlling the first pair of transistor switches to turn on when a second control signal is received before the time period TOFF_a reaches a threshold time TOFF_trans_a.

16. The method of claim 15, further comprising:

controlling the third pair of transistor switches to remain on when the second control signal is not received before the time period TOFF_a reaches the threshold time TOFF_trans_a;

controlling the second pair of transistor switches in the buck-boost converter to turn on when the time period TOFF_a expires;

controlling the third pair of transistor switches to turn on when a third control signal is received before a time period TON_a reaches a maximum threshold time TONmax;

controlling the first pair of transistor switches to turn on when the control signal is not received before the time period TON_a reaches the maximum threshold time TONmax and begin the time period TON_b; and controlling the third pair of transistor switches to turn on when a fourth control signal is received before the time period TON_b reaches a threshold time TON_trans_b.

17. The method of claim 16, further comprising controlling the first pair of transistor switches to remain on when the fourth control signal is not received before the time period TON_b reaches the threshold time TON_trans_b.

18. The method of claim 16, wherein the method comprises transitioning among a buck operation mode, a boost operation mode, and a tri-phase switching operation mode.

19. The method of claim 18, wherein transitioning among the buck operation mode, the boost operation mode, and the tri-phase switching operation mode is determined at least in part by an amount of time that a pair of the transistor switches of the buck-boost converter have been turned on.

20. The method of claim 19, wherein the tri-phase switching operation mode begins with a first of the buck operation mode or the boost operation mode and ends with a second of the buck operation mode or the boost operation mode.

* * * * *